United States Patent [19]
Morford

[11] Patent Number: 6,053,436
[45] Date of Patent: Apr. 25, 2000

[54] PARTICULATE POWDER DISPENSER

[76] Inventor: Marvin Morford, 1815 Ashworth Rd., West Des Moines, Iowa 50265

[21] Appl. No.: 09/302,310

[22] Filed: Apr. 30, 1999

[51] Int. Cl.$^7$ ...................................................... A01C 3/06
[52] U.S. Cl. .......................... 239/654; 239/143; 222/333; 222/402; 406/38
[58] Field of Search ..................................... 239/654, 142, 239/143, 337, 346, 351; 222/61, 79, 401, 402, 333; 406/38, 136, 139, 141, 142, 146

[56] References Cited

U.S. PATENT DOCUMENTS

| | | | |
|---|---|---|---|
| 2,029,408 | 2/1936 | Bramsen et al. | 239/654 |
| 3,586,215 | 6/1971 | Roche | 222/333 |
| 5,119,993 | 6/1992 | Gunzel, Jr. et al. | 239/654 |
| 5,409,166 | 4/1995 | Gunzel, Jr. et al. | 239/142 |
| 5,429,278 | 7/1995 | Sansalone | 222/333 |

FOREIGN PATENT DOCUMENTS

| | | | |
|---|---|---|---|
| 2232369 | 1/1975 | France | 239/654 |

*Primary Examiner*—Andres Kashnikow
*Assistant Examiner*—Lisa Ann Douglas
*Attorney, Agent, or Firm*—G. Brian Pingel

[57] ABSTRACT

An electrically powered device for dispensing particulate material by an air stream is formed from a housing with a handle portion and a reservoir portion which is positioned in front of the handle portion and includes an arcuately shaped bottom wall, a top wall, an exit passage associated with the top wall, and an inlet passage leading from the handle portion to the reservoir portion, and further including an air supply associated with the inlet passage for providing air thereto.

9 Claims, 7 Drawing Sheets

PARTICULATE POWDER DISPENSER

BACKGROUND OF THE INVENTION

1. Field of the Invention

The present invention relates in general to electrically powered devices for dispensing particulate material and more specifically to such devices that can be easily and efficiently carried and operated by hand to supply a narrow stream of particulate powder where desired.

2. Description of the Prior Art

A variety of powered particulate dispensing devices are known in the art and involve numerous different configurations. For example, U.S. Pat. No. 5,226,567 discloses a portable garden power duster that relies upon a stream of air for conveying a dusting agent from a reservoir to be discharged from an outlet end on garden plants. Another example is disclosed in U.S. Pat. No. 4,678,377 that describes a different structure for providing a dispersal of particulate matter by means of an air stream. Although these prior art devices appear to be useful, they both are of an elongated configuration that is inconvenient for easy caring. Thus, there exists a need in the art for a compact powered dispensing device that can provide an extremely precise stream of air entrained with powder particulates accurately and conveniently.

SUMMARY OF THE INVENTION

The present invention provides an electrically powered device for dispensing particulate material by means of an air stream. The device of the present invention includes a housing with a handle portion and a reservoir portion positioned in front of the handle portion and formed with an arcuately shaped bottom wall, an upper exit passage, and a lower inlet passage that is associated with an air supply means to provide a stream of air into the reservoir.

The inlet passage leads from the handle portion to the reservoir portion and is located near the bottom wall of the reservoir portion. The exit passage is associated with the top wall of the reservoir and is narrow and elongated to extend from the front of the reservoir portion toward the handle portion.

The air supply means is preferably formed of an air compression means and a motor means for driving the compression means, which means are both located in the upper handle portion. The motor means is supplied with electrical power from an electrical power supply that is manually actuable when it is desired to dispense particulate material.

The foregoing and other advantages of the present invention will appear from the following description. In the description, reference is made to the accompanying drawings, which form a part hereof, and in which there is shown by illustration, and not of limitation, a specific form in which the invention may be embodied. Such embodiment does not represent the full scope of the invention, but rather the invention may be employed in a variety of embodiments, and reference is made to the claims herein for interpreting the breadth of the invention.

DETAILED DESCRIPTION OF THE PREFERRED EMBODIMENT

Figure 1:
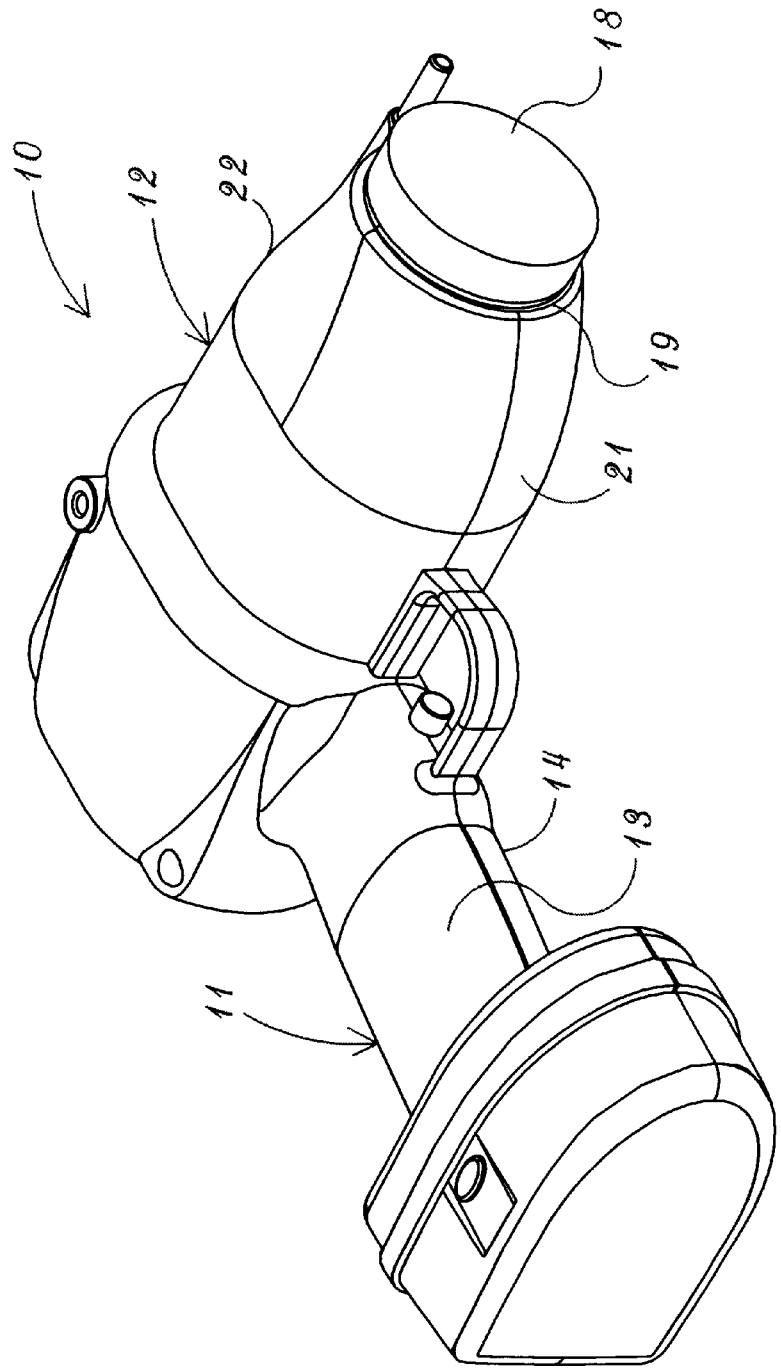
FIG. 1 is a side perspective view of a preferred embodiment of the particulate dispensing device of the present invention.

Referring now to the drawings and with reference first to FIG. 1, a preferred embodiment of a device for dispensing particulate material of the present invention is disclosed generally at 10. As can be seen therein, the device 10 is of a pistol-type configuration that is compact in size so that it is highly convenient for carrying and operating. The device 10 is principally formed from a handle 11 and a front reservoir 12 that are attachable together as will be described below.

Figure 2:
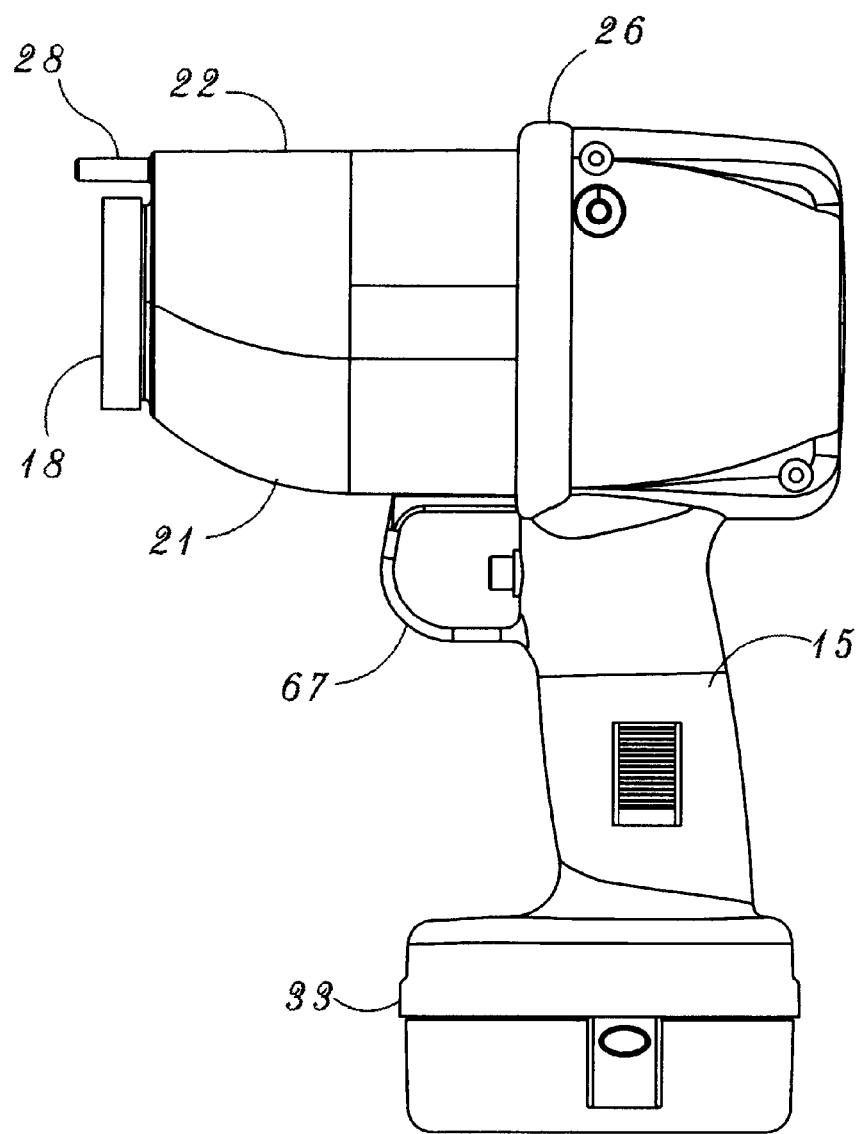
FIG. 2 is a side view in elevation opposite of that shown in FIG. 1.
Figure 3:
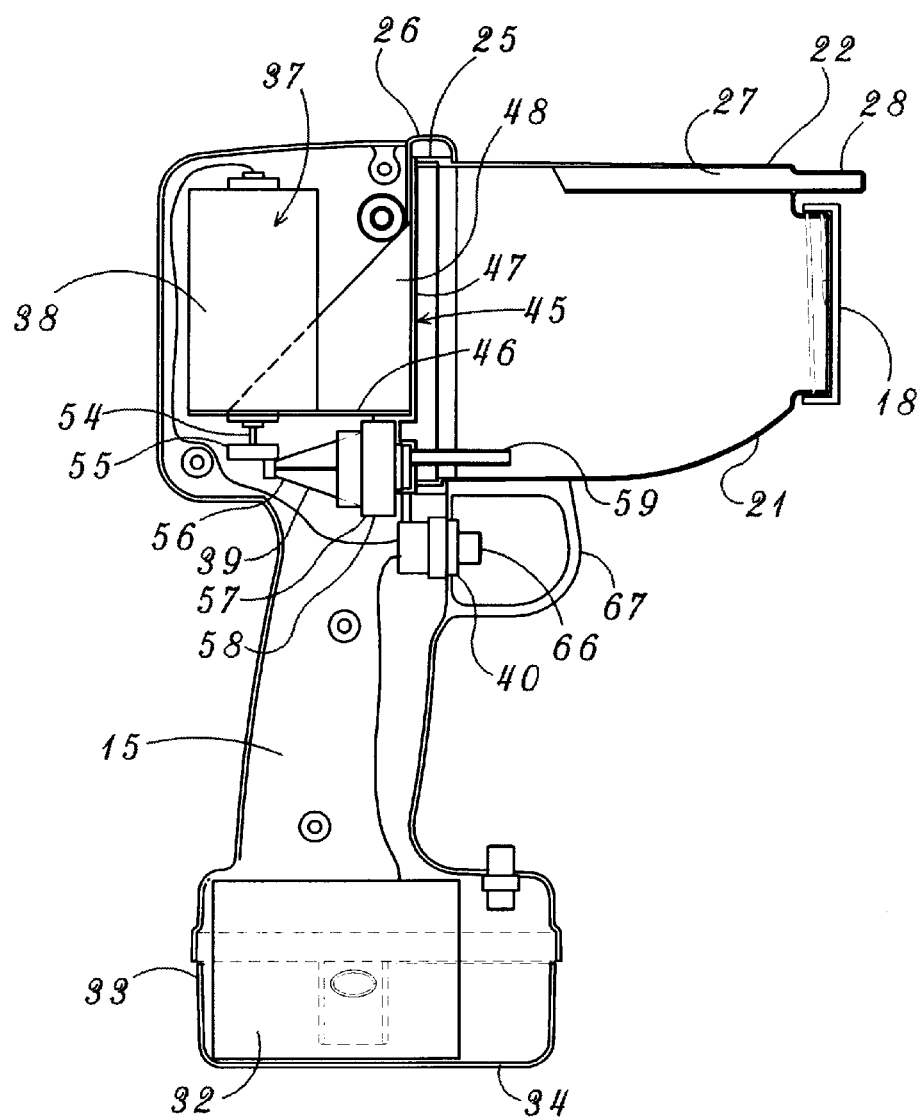
FIG. 3 is a cross-sectional view of the embodiment of FIG. 1 taken along the line 3—3 of FIG. 5.
Figure 4:
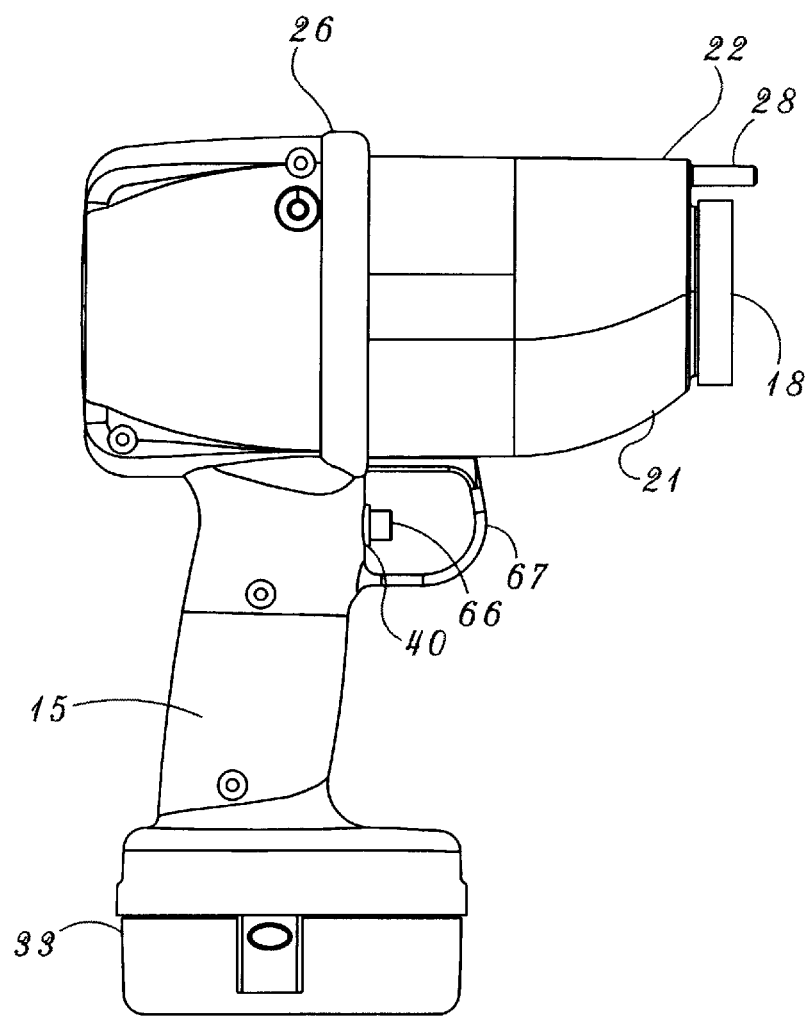
FIG. 4 is a side view in elevation of the embodiment shown in FIG. 1.
Figure 5:
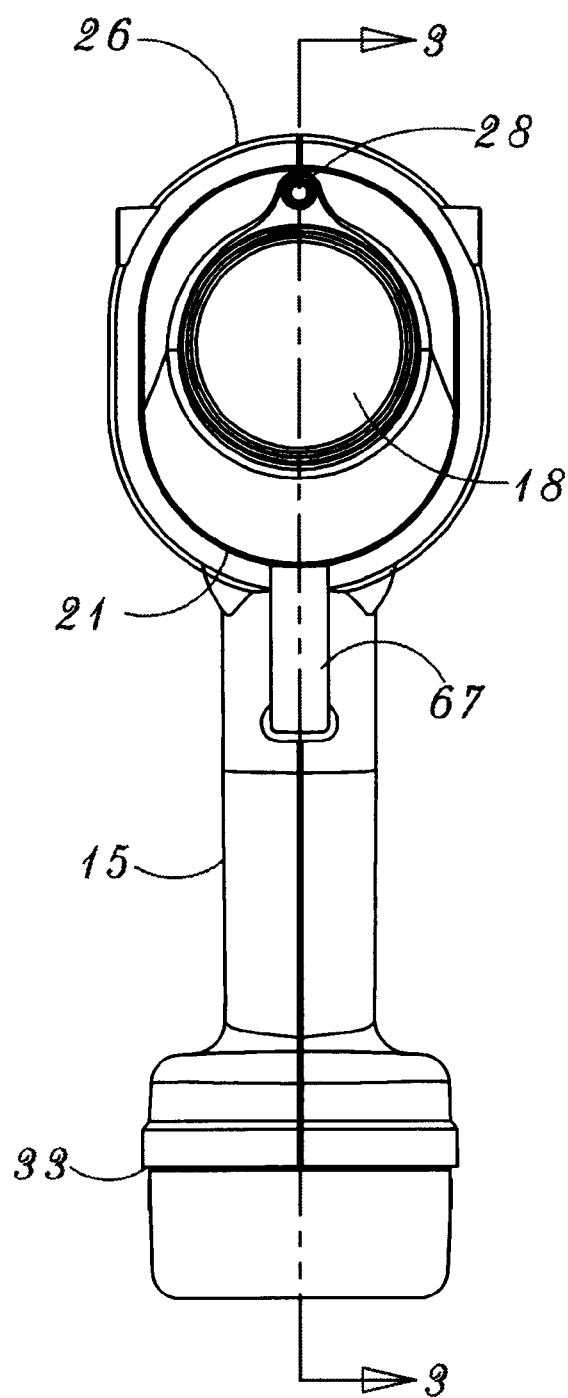
FIG. 5 is a front view in elevation of the embodiment of FIG. 1.
Figure 6:
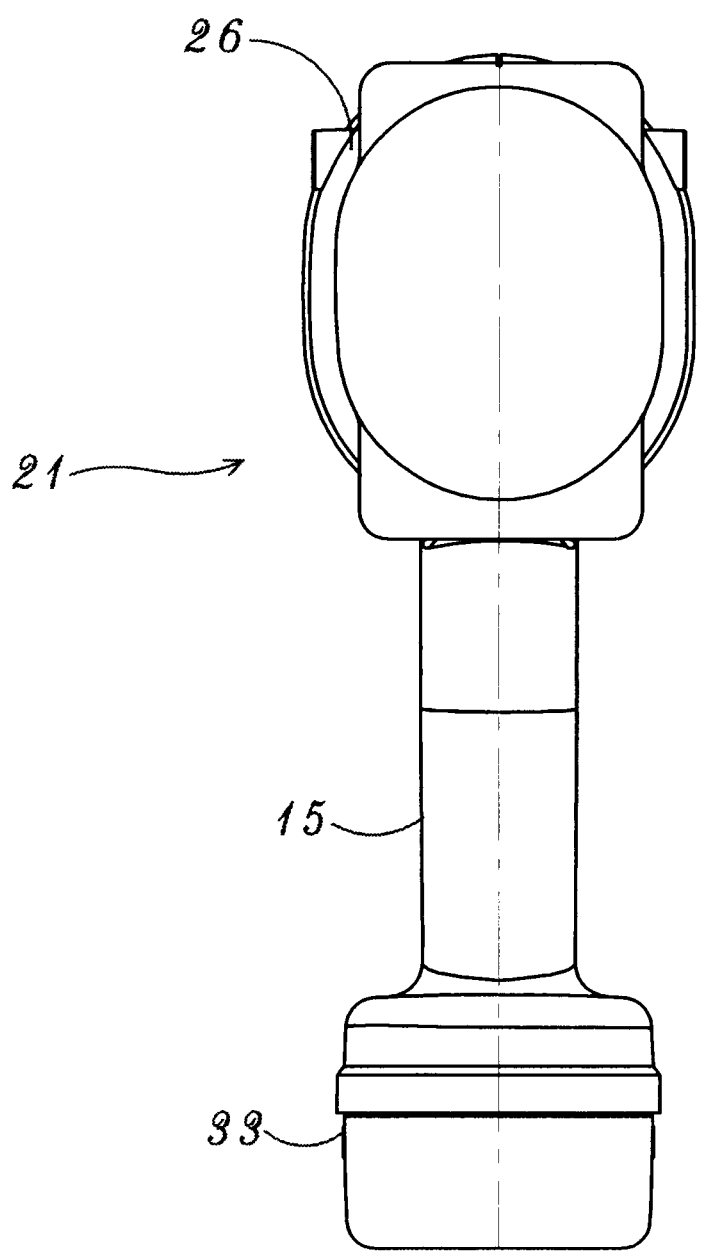
FIG. 6 is a rear view in elevation of the embodiment of FIG. 1.
Figure 7:
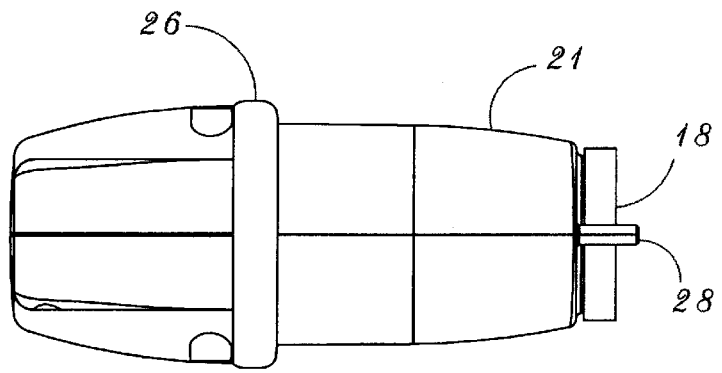
FIG. 7 is a plan view of the embodiment of FIG. 1.
Figure 8:
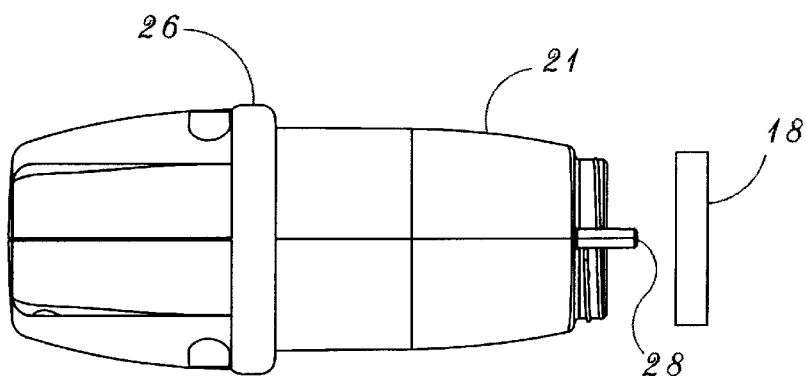
FIG. 8 is a plan view of the embodiment of FIG. 1 with the front cap removed.

The handle 11 is equally divided into shell-type side portions 13 and 14 that are combined together preferably by screws to form a hollow interior 15 (indicated only in FIG. 3) for serving as a housing for various of the components of the device 10. Referring now to FIGS. 1, 2 and 4, the reservoir 12 is somewhat barrel shaped to serve as a storage means for the particulate material to be dispersed by the device 10. A cap 18 is attachable to a threaded front end 19 of the reservoir 12 to permit easy access to an interior 20 of the reservoir 12 for the filling thereof with particulate material.

The reservoir 12 is formed with an arcuately shaped bottom wall 21 that is angled forwardly and upwardly to merge with the front end 19. A top wall 22 of the reservoir 12 extends substantially in a straight line from rear to front, although it has a slight transverse curvature to it. As shown in FIG. 3, the rear end of the reservoir 12 terminates in a flange 25 that is receivable in a channel 26 formed by the shell halves 13 and 14 of the handle 11 to secure the reservoir to the handle. The reservoir interior 20 is formed with a tubular shaped exit passage 27 located adjacent the top wall 22, which passage has a relatively needle nose-type front end 28 and extends rearwardly therefrom approximately three-quarters of the distance to the rear end of the reservoir 12.

The device 10 is electrically powered preferably by a rechargeable battery pack 32 that is located within a base portion 33 of the handle 11, which base portion includes a removable bottom section 34 for changing the battery pack 32.

An air supply means 37 is preferably located in the upper half of the handle 11 and is formed by the battery pack 32, a motor 38, an air compression means 39 and an actuating trigger mechanism 40. The motor 38 and air compression means 39 are supported on somewhat of an L-shaped frame 45 that includes a lower plate 46 that serves as a mounting base for the motor 38 and a front plate 47 that is orthogonally disposed with respect to the plate 46 and serves to close off the rear of the reservoir 12. The front plate 47 is sized to fit into the channel 26 of the handle 11 so that the frame 45 is held in position thereby when the handle sections 13 and 14 are assembled. Preferably, the front plate 47 and lower plate 46 are connected together by triangularly shaped side plates 48 (only one of which is shown in FIG. 3) to provide a rugged and durable structure.

The motor 38 drives the air compression means 39 by use of a motor drive shaft 54 on which is mounted a drive disk 55. A piston type member 56 is pinned to the outer periphery of the drive disk 55 and is rotatable with respect thereto so that when the motor shaft 54 is driven, the rotational motion of such shaft is converted into reciprocating motion of the piston 56. The front end of the piston 56 is connected to a bellows 57 that is disposed within a small cylinder 58 attached to the frame 45. As the piston 56 reciprocates back and forth, it opens and closes the bellows 57 to supply compressed air to a narrow inlet tube 59 for the reservoir 12. The tube 59 leads from the interior of the cylinder 58 through the front plate 47 and into the reservoir interior 20.

Preferably, actuation of the device 10 is a two step operation. First, the device 10 must be turned on by means of an electrical on and off switch 64 (FIG. 2 only) located on the handle 11. Unless the switch 64 is actuated to an on condition, no operation of the device 10 will occur. If the switch 64 is in an on position, the trigger mechanism 40 can then be actuated to place the gun 10 in operation. The trigger mechanism 40 includes a trigger 66 that can be pressed inwardly to turn the motor 38 on. To prevent accidental operation of the device 10, the trigger 66 is shielded by trigger guard 67 that is formed by the handle sections 13 and 14.

In operation, when both the switch 64 and trigger 66 have been actuated to an on position, the motor 38 drives the piston 56 and in turn the bellows 57 to supply compressed air through the inlet tube 59 into the reservoir 12. The compressed air stream entering the reservoir 12 causes the particulate materials stored therein to move first in an upwardly, arcuate fashion and then rearwardly as the arcuate shape of the reservoir 12 causes a somewhat rotational motion of the particulate material. A portion of the particulate material entrained within this rotational air stream provided from the inlet tube 59 exits from the reservoir 12 through the exit passage 27 and out the needle nose end 28 thereof Through this indirect movement of the particulate material within the reservoir 12 and through the exit passage 27, a fine stream of particulate material is provided by the device 10, which stream can be accurately directed as desired. Thus, the dispensing device of the present invention provides a compact and efficient means for accurately dispensing particulate material as desired.

Although the invention has been described with respect to a preferred embodiment thereof, it is to be understood that it is not to be so limited, since changes and modifications can be made therein which are within the full intended scope of this invention as defined by the appended claims.

What is claimed is:

1. An electrically powered device for dispensing particulate material by means of an air stream comprising:
    (a) a housing having a handle portion and a reservoir portion attachable together;
    (b) said reservoir portion is positioned in front of said handle portion and includes:
        (i) an arcuately shaped bottom wall;
        (ii) a top wall;
        (iii) an exit passage associated with said top wall extending from the front of said reservoir portion toward said handle portion;
        (iv) an inlet passage leading from said handle portion to said reservoir portion and located near the bottom wall of said reservoir portion; and
    (c) air supply means associated with said inlet passage for providing air to said passage.

2. The dispensing device as recited in claim 1, wherein said air supply means comprises:
    (a) air compressing means;
    (b) motor means for driving said air compressing means;
    (c) electrical power supply means that is actuable for providing electrical power to said motor means when it is desired to dispense said material; and
    (d) means for actuating said power supply means.

3. The dispensing device as recited in claim 1, wherein said reservoir portion has a removable lid for filling said reservoir with particulate material.

4. The dispensing device as recited in claim 1, wherein said exit passage is tubular shaped and has a length that exceeds half of the length of the top wall of said reservoir.

5. The dispensing device as recited in claim 1, wherein said exit passage includes a narrowed front end portion to limit the amount of material dispensed by said device.

6. The dispensing device as recited in claim 2, wherein said air compressing means comprises:
    (a) a piston reciprocally driven by said motor means;
    (b) a bellows attached to said piston for being opened and closed during the reciprocal movement of said piston; and
    (c) a cylinder enclosing said bellows.

7. The dispensing device as recited in claim 6, wherein said inlet passage is tubular shaped and extends from the interior of said cylinder to the interior of said reservoir portion.

8. The dispensing device as recited in claim 2, wherein said electrical power supply means is a rechargeable battery pack.

9. The dispensing device as recited in claim 2, wherein said means for actuating said power supply means includes a safety switch to prevent accidental actuation of the device.

* * * * *